Feb. 20, 1973   D. R. HOOVER ET AL   3,717,192
TIRE CHANGING APPARATUS FOR SMALL UTILITY TRAILER WHEELS
Filed April 7, 1971   2 Sheets-Sheet 1

INVENTOR
DONALD R. HOOVER
GLENN P. KELLY

BY Hunt, Heard & Rhodes

ATTORNEY

Feb. 20, 1973   D. R. HOOVER ET AL   3,717,192
TIRE CHANGING APPARATUS FOR SMALL UTILITY TRAILER WHEELS
Filed April 7, 1971   2 Sheets-Sheet 2

INVENTOR
DONALD R. HOOVER
GLENN P. KELLY

BY Hunt, Heard & Rhodes
ATTORNEY

# United States Patent Office 3,717,192
Patented Feb. 20, 1973

3,717,192
TIRE CHANGING APPARATUS FOR SMALL
UTILITY TRAILER WHEELS
Donald R. Hoover, Rte. 3, Gastonia, N.C. 28052, and
Glenn P. Kelly, 332 Lancelot Circle NE., Concord,
N.C. 28025
Filed Apr. 7, 1971, Ser. No. 132,113
Int. Cl. B60c 25/06
U.S. Cl. 157—1.1                                 5 Claims

ABSTRACT OF THE DISCLOSURE

A support plate having locking openings therethrough includes a downwardly extending securing means and an upwardly extending fulcrum post. A collar concentrically surrounds and is secured to the fulcrum post at a point spaced slightly above the upper surface of the support plate. As the wheel is initially received on the support plate, the locking openings in the plate are not in registry with the bolt openings in the wheel, so that the wheel must be shifted laterally to bring the bolt openings and the locking openings into alignment. The lateral shifting moves a portion of the wheel beneath the collar, and upon insertion of one or more locking pins through the bolt openings in the wheel and into the support plate, the wheel is securely held against lateral or vertical displacement during the tire changing operation. A tire tool includes at least one recess along the longitudinal edge thereof for the purpose of improving the lever angle of the tool when in operative engagement with the rim of the wheel.

BACKGROUND OF THE INVENTION

The present invention is directed to a lightweight, portable, simply operated tire changing apparatus that is economically manufactured and especially adapted for easy and convenient use with the wheels of lightweight vehicles such as carts, wagons, and utility trailers of the type used to transport boats, golf carts, snowmobiles and the like.

The increasing popularity of outdoor recreational activities has brought about a substantial increase in the number and types of towing trailers for use in towing boats, campers, mobile homes, horses, racing cars, golf carts, snowmobiles, and other utility type trailers. Such trailers utilize conventional pneumatic tires on a smaller wheel than is conventionally used with passenger automobiles, and therefore in the event it is necessary to change a tire, such apparatuses as are conventionally known are unsatisfactory in use.

Trailer wheels, as substantially all conventional late model wheel rims manufactured in this country and designed for use on passenger vehicles, are provided with a generally flat central portion of circular configuration having a plurality of mounting apertures or openings formed therein and disposed in a pattern about the outer periphery of the flat central portion. In addition, this flat central portion is provided with a central aperture or opening adapted to receive therethrough the outwardly projecting hub or spindle portion of the axle of the associated vehicle. Conventional passenger car wheel tire changing machines are designed to support and handle this particular type of wheel rim and most are designed to include a central upright post adapted to be received through the aforementioned central opening in the flat portion, and are further provided with separable inverted truncated cone-shaped members slidable on the upright post and capable of being at last partially received in the central opening in a manner to stationarily secure and clamp a vehicle wheel on such a tire changing machine. Such wheel changing machines, however, are not adapted to receive the smaller trailer wheels, and therefore it is difficult to find a service station that will change utility trailer tires. Moreover, conventional tire changing machines include a heavy and bulky super-structure therebeneath to elevate the wheel to a position where it may be easily worked upon by a service station attendant. For this reason, conventional tire changing machines are heavy, substantially non-portable, expensive, and are further ill adapted for use with smaller wheels such as used on trailers of the type considered herein.

SUMMARY OF THE PRESENT INVENTION

The present invention, on the other hand, is directed to a tire changing apparatus specifically adapted for use with small utility trailer wheels and the like, and is of such simplicity and so economically manufactured, that it is not an expensive item for service stations to carry. Moreover, it is even practical for the boat owner to carry his own tire changing apparatus, needing only a conventional vise to set it up.

The apparatus is peculiarly adapted for use with trailer wheels of the type having a rim, a flat central portion with a central axle receiving opening and a circular pattern of small bolt receiving openings therearound and in this respect generally comprises a support plate of approximately the same diameter as or slightly smaller than the central flat portion of the wheel, means extending downwardly from the support plate for releasably, yet securely positioning the support plate to a holding means in the work area, a fulcrum post extending upwardly from the center of said support plate, and a locking means for preventing vertical and lateral movement of the wheel during the tire changing operation. The locking means includes a first anchoring means partially overlying the flat central portion for preventing vertical movement and a second anchoring means including pins insertable through the bolt openings into aligned locking openings in the support plate to prevent lateral movement of the wheel. The locking openings in the plate do not register with the corresponding bolt openings in the wheel upon initial positioning of the wheel, rather registry occurs when wheel is shifted laterally to a position underlying the first locking member.

A tire tool is adapted for engagement with the fulcrum post in a conventional manner to force the tire from the wheel by engaging a hook-shaped element at one end of the tire tool between the wheel rim and the tire. For convenience in this operation, a recess in the longitudinal side edge of the tire tool receives the fulcrum post to prevent slippage of the tool, and so that the tire tool is as much of a radial arm as possible to obtain better leverage in manipulating the tool.

It is therefore an object of the present invention to provide a lightweight, simple and economical tire changing apparatus adapted for use in changing tires on small wheels of such vehicles as utility trailers and the like.

It is another object of the present invention to provide a portable tire changing apparatus of the type described which may be operatively mounted onto any type of suitable, conventional holding device, and does not require a heavy, bulky, specially adapted stand used only for that purpose.

It is yet a further object of the present invention to provide a tire changing apparatus of the type described having a unique, simple locking means associated therewith for preventing lateral and/or vertical shifting of the wheel during the tire changing operation.

Other objects and a fuller understanding of the invention may be had by referring to the claims and the accompanying drawings, in which:

Referring now more specifically to the drawings, the numeral 10 refers to a tire changing apparatus according to the present invention, which is used to mount small trailer wheels for the purpose of changing a tire T. Wheel W conventionally includes a flat, central portion W' having a conventional rim portion R encircling the peripheral edge thereof. An opening C in the central area of the flat portion W' allows the wheel to be slipped over the outwardly extending hub of the axle of a trailer, while a series of smaller mounting stud receiving openings B are arranged in a circular pattern around opening C corresponding to the pattern of the wheel mounting apertures of conventional automobile wheel rims manufactured in this country.

Figure 1:
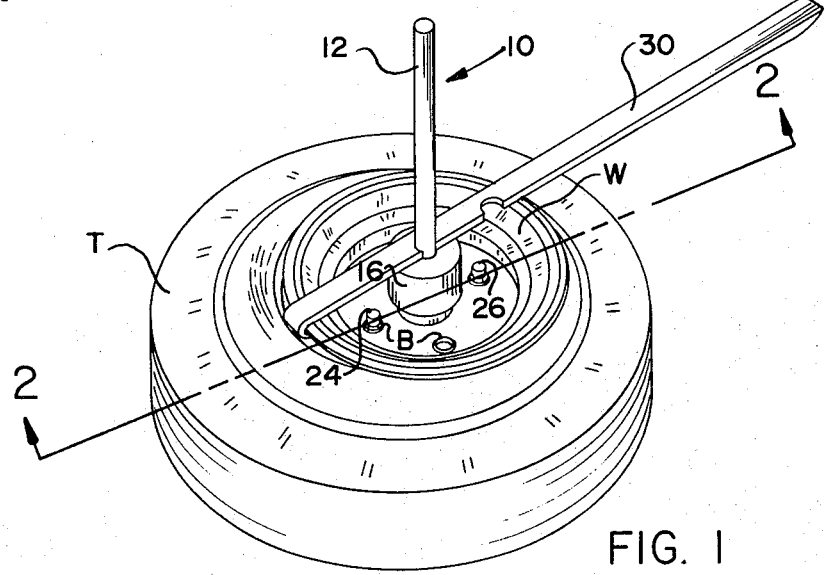
FIG. 1 is an environmental perspective view illustrating a wheel mounted on the apparatus of the present invention.
Figure 2:
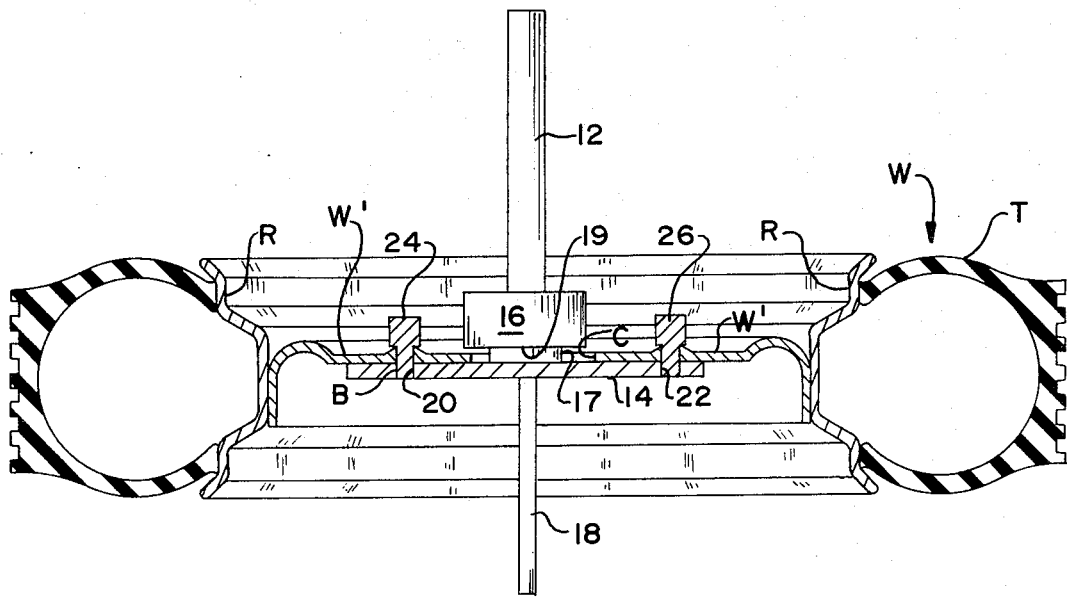
FIG. 2 is a sectional view taken substantially along lines 2—2 in FIG. 1.
Figure 3:
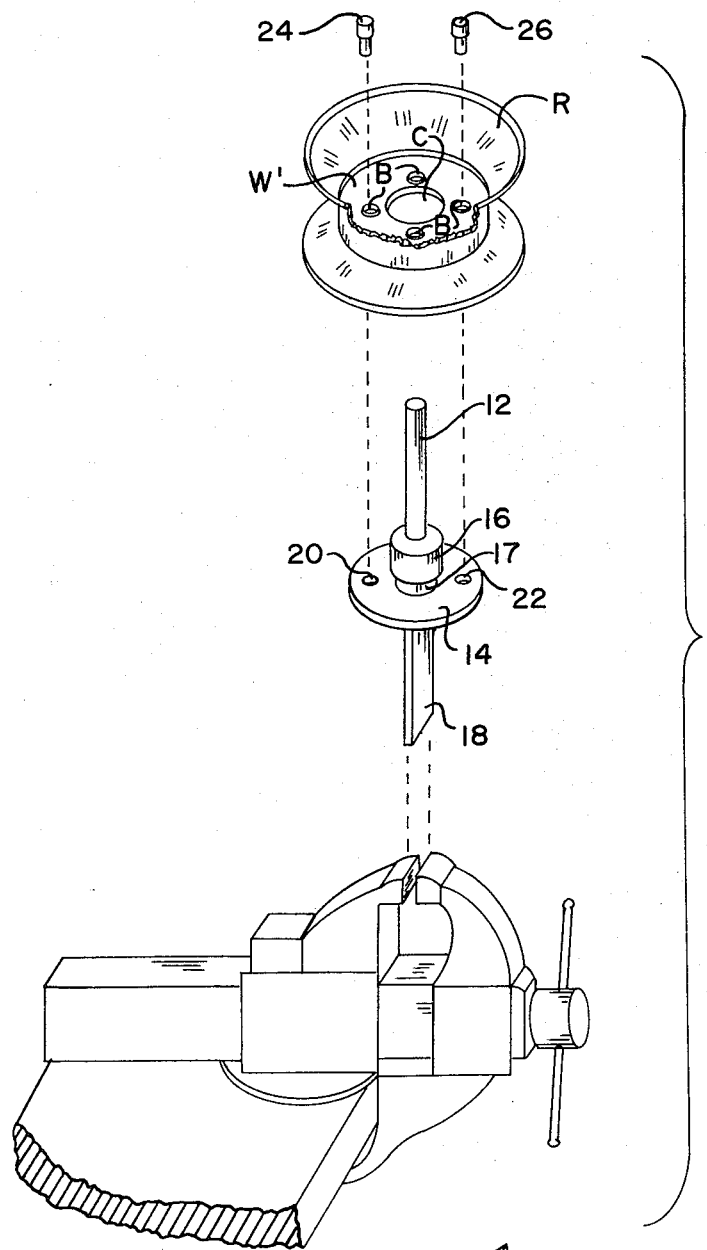
FIG. 3 is an exploded, perspective view, with parts broken away for the purpose of clarity, illustrating the and a vise into which the apparatus mounts, each of the apparatus according to the present invention, a tire wheel, components being removed from the other.
Figure 4:
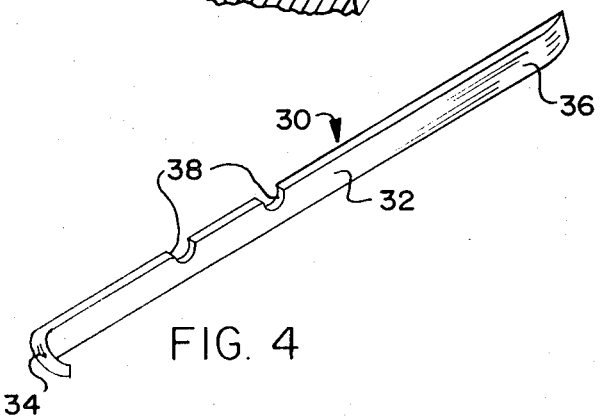
FIG. 4 is a perspective view of a tire tool adapted for use in connection with the present invention.

Referring now more particularly to FIGS. 2 and 3, the tire changing apparatus 10 according to the present invention comprises a support base in the form of a flat plate 14, a fulcrum post 12 extending upwardly from the center portion of said plate, a locking means in the form of a first anchoring means (collar 16 secured to the post 12), having a vertical axis and surrounding said fulcrum post 12 and being of a diameter approximately equal to or slightly smaller than the central opening C in the flat portion W' of wheel W. An undercut portion 17 provides a shoulder 19 beneath collar 16 and slightly spaces the collar 16 from the upper surface of the support plate 14 a distance at least equal to the wall thickness of flat portion W'.

The aforementioned locking means further includes a second anchoring means wherein at least one locking opening 20 is provided in support plate 14. The radial dimension of opening 20 from the vertical axis of collar 16 differs slightly from the corresponding radial dimension between stud receiving openings B and the center of the central axle receiving opening in wheel W. The aforementioned difference in radial dimensions does not exceed the radial dimension of shoulder 19. So arranged, as wheel W is initially received over fulcrum post 12 and onto base 14, it is to be noted that opening 20 and the corresponding bolt opening B in the wheel are not in registry due to the difference in radial dimensions, and it is only when wheel W is shifted laterally to a position with the center of the central wheel opening C and the axis of fulcrum post 14 offset from one another that such registry occurs. It should be pointed out that the preceding arrangement is only one way of anchoring the wheel with a portion of the wheel underlying collar 16. In an alternate arrangement (not illustrated), for example, the axis of collar 16 could be offset from the axis of post 12. Upon accomplishing the aforementioned registry, a securing pin 24 is inserted through the aligned opening 20 and axle receiving opening B, thereby preventing lateral movement of wheel W during the tire changing operation. Further, and if desired a second locking opening 22, spaced from opening 20 a distance equal to the corresponding distance between two bolt openings B, may be provided in plate 14, in which case a second securing pin 26 is inserted through a second pair of aligned openings in plate 14 and wheel W.

A means for securing the apparatus to some sort of holding device, such as a vise, extends downwardly from support plate 14 and may take the form of a bar 18 which is received within a vise for securely mounting the tire changing apparatus. It is to be recognized that other types of securing means might prove equally acceptable.

A tire tool 30 used with apparatus 10 is somewhat similar to a conventional tire tool in that it includes generally an elongated shaft 32 having a hook 34 at one end thereof which is inserted between wheel rim R and the tire T. The shaft portion 32 is then positioned adjacent fulcrum post 12, a force is applied to the other end 36 of the tool 30, and using the tool as a lever, the hook portion 34 is forced around the rim of the tire to completely separate and remove the wall from the rim in a well known manner. The distance that the wheel is offset from the axis of fulcrum post 12 is relatively slight as compared with the distance the shaft 32 is bent back to form hook 34, so that the hook 34 remains under the rim R of the wheel as it is urged therearound, even though the base of hook 34 may not always remain in engagement with rim R. The difference between tire tool 30 and a conventional tire tool is the addition of notches 38 in one edge of shaft portion 32. The notch 38 to be used with any particular tire is that notch which is at a distance from the hook end equal to the radius of the wheel W from the center to the edge of rim R. So constructed, and with tires of such small diameter, the lever more nearly approaches a radius of the wheel, so that the hook 34 tends to remain in engagement with the rim R, rather than sliding therefrom as might be the case if no notch 38 is provided.

In operation the tire changing apparatus 10 is positioned in some type of holding device such as a vise by inserting plate 18 between the jaws of the vise and tightening the jaws thereupon. The wheel to be changed is then initially positioned on support plate 14 with the central opening C sliding down over the periphery of collar 16. A lateral force is then exerted to shift the wheel sidewise until the bolt openings B align with the openings 20 and 22 in plate 14. Pins 24 and 26 are then inserted into the openings 20 and 22 through bolt openings in the wheel to prevent lateral dislodgement of the wheel, while collar 16 overlies a portion of the flat central area of the wheel to prevent vertical dislodgement. The tire tool is then positioned with hook 34 extending between the rim and the side wall of the tire and one of notches 38 receiving fulcrum post 12. From there on the tire is changed in a normal, conventional manner which is well known in the art.

The foregoing description is considered to be illustrative of the principles of the invention, and since numerous modifications and changes will readily occur to those skilled in the art, the invention is not considered to be limited to the exact construction and operation shown and described. Accordingly, all suitable modifications and equivalents which may be resorted to are considered to fall within the scope of the invention as claimed.

What is claimed is:

1. A tire changing apparatus for utility trailer wheels having a rim, a flat central portion with a central axle receiving opening and a circular pattern of smaller bolt receiving openings therearound, said apparatus comprising:

a support base;

means extending downwardly from said support base for releasably securing said support base to a holding means;

a fulcrum post extending upwardly from said support base;

locking means for preventing vertical and lateral movement of the wheel during the tire changing operation, said locking means including:

first anchoring means overlying a portion of the edge surrounding the central opening in said wheel and preventing said vertical movement; and second anchoring means comprising at least one locking opening in said base, said base locking opening aligning with said bolt openings only when the first locking means overlies the edge of the wheel central portion surrounding said central opening, pin means for insertion into said locking opening and said bolt opening upon registry thereof.

2. The tire changing apparatus according to claim 1 wherein said first anchoring means comprises a collar having a vertical axis and attached to said fulcrum post, said collar spaced from said support base a distance along said axis at least equal to the thickness of the central portion of said wheel.

3. The tire changing apparatus according to claim 2 wherein the radial dimension between said locking opening and the vertical axis of said collar is different from the corresponding radial dimension between one of the bolt openings and the center of said axle receiving opening.

4. The tire changing apparatus according to claim 1 wherein said second anchoring means comprises a second locking opening in said base, the second opening being spaced from said one opening a distance equal to the spacing between two corresponding bolt receiving openings in the wheel.

5. The tire changing apparatus according to claim 1 and further including a tire tool comprising an elongated shaft with a hook at one end, a notch in said shaft spaced from the hook end a distance equal to the radius of said wheel rim.

References Cited
UNITED STATES PATENTS

| | | | |
|---|---|---|---|
| 1,257,666 | 2/1918 | Barnes | 144—288 A |
| 2,850,061 | 9/1958 | Twiford | 157—1.24 X |

GRANVILLE Y. CUSTER, Jr., Primary Examiner

U.S. Cl. X.R.

157—1.24, 1.3; 269—97